United States Patent [19]

Petzetakis

[11] 4,033,808

[45] July 5, 1977

[54] APPARATUS FOR THE PRODUCTION OF HOLLOW BODIES, ESPECIALLY LARGE-DIAMETER DUCTS FROM THERMOPLASTIC SYNTHETIC RESIN

[76] Inventor: Aristovoulos George Petzetakis, Thessaloniki and Chandri Street, Moschaton, Piraeus, Greece

[22] Filed: Jan. 30, 1975

[21] Appl. No.: 545,748

Related U.S. Application Data

[62] Division of Ser. No. 371,559, June 19, 1973, Pat. No. 3,917,500.

[30] Foreign Application Priority Data

June 21, 1972  Greece .................................. 48609

[52] U.S. Cl. .............................. 156/425; 156/428; 156/498; 156/500; 425/321; 425/322
[51] Int. Cl.² ...................... B31C 13/00; B29F 3/00
[58] Field of Search ........... 156/184, 194, 195, 218, 156/306, 392, 425, 428, 429, 446, 450, 497, 498, 500, 456; 264/99, 173, 176 R, 177 R, 248, 281, 339, 209; 425/60, 63, 113, 223, 224, 319, 321, 322, 329, 334, 365, 364

[56] References Cited
UNITED STATES PATENTS

| | | | |
|---|---|---|---|
| 2,573,300 | 10/1951 | Beaumariage et al. ............ | 425/322 |
| 2,644,983 | 7/1953 | Curtiss ............................... | 264/173 |
| 2,671,939 | 3/1954 | Everhart et al. ................... | 425/322 |
| 3,825,641 | 7/1974 | Barvett ............................. | 264/177 R |

Primary Examiner—Caleb Weston
Attorney, Agent, or Firm—Karl F. Ross; Herbert Dubno

[57] ABSTRACT

A system for the production of large-diameter hollow bodies from a thermoplastic synthetic resin in which a synthetic-resin hollow-profile strip is extruded and coiled helically so that adjacent turns of the helix are butt-welded together at least in part with the extrusion heat. The synthetic-resin hollow-profile strip has a generally rectangular external cross-section and a substantially round inner cross-section (of the passage) and a cooling fluid is introduced into this passage upon extrusion, and is circulated through the passage at least over a portion of a turn of the helix.

3 Claims, 6 Drawing Figures

APPARATUS FOR THE PRODUCTION OF HOLLOW BODIES, ESPECIALLY LARGE-DIAMETER DUCTS FROM THERMOPLASTIC SYNTHETIC RESIN

CROSS-REFERENCE TO COPENDING APPLICATION

The present application is a division of Ser. No. 371,559 filed June 19, 1973 (now U.S. Pat. No. 3,917,500) and is related to the commonly owned copending application Ser. No. 371,558 filed concurrently herewith and entitled "LARGE-DIAMETER HOLLOW BODIES OF HELICAL THERMOPLASTIC STRIP"(now U.S. Pat. No. 3,926,223).

FIELD OF THE INVENTION

The present invention relates to an apparatus for the formation of large-diameter hollow bodies from an extruded thermoplastic strip and, more particularly, to a system for the production of large-diameter generally cylindrical ducts, pipes, conduits, tubes, containers or vessels from a helically coiled thermoplastic strip.

BACKGROUND OF THE INVENTION

The aforedescribed copending application deals with large-diameter hollow bodies, especially waste and sewer pipe, for subterranean use whereby deflection or bending of the pipe is possible within the elastic limit of the synthetic-resin material so that, with time, the deformation stresses are eliminated by a relaxation process. The instant application deals with an apparatus for the making of such pipe and it is to be understood that the product of the present method and apparatus is any one of the synthetic-resin ducts or tubes described in the aforementioned copending application.

In the manufacture of pipe, helical-seam techniques have gained increasing interest. For example, steel or other metal strip may be fed tangentially to a cylindrical mandrel at an angle to the axis thereof so that the strip is coiled in a multiplicity of successive turns on the mandrel with confronting edges of the successive turns being welded together by deposit-welding, i.e. the formation of a weld bead or weldment along the helical seam between the turns.

Such a system permits large-diameter ducts to be made with substantially unlimited length, using a strip of narrow width and unlimited length.

With the advent of synthetic resins, considerable effort was invested in developing an analogous system for the production of thermoplastic synthetic-resin pipes and there have been described in the literature, systems in which strips of synthetic resin were coiled so that overlapping flanges were formed and heat-sealed or otherwise bonded together. The fusion pressure is thus applied in the radial direction.

Pipe of this type has insufficient flexibility for subterranean disposition as a waste pipe. The radial pressure has effectively precluded the use of hollow strips for this purpose, at least where an internal passage is to be maintained in the strip.

OBJECTS OF THE INVENTION

It is the principal object of the present invention to provide an apparatus for the production of large-diameter ducts which is relatively simple and versatile and is capable of producing an improved product.

Another object of the invention is to provide a method of making large-diameter hollow bodies from a thermoplastic synthetic-resin strip at relatively low cost and relatively high output.

It is another object of the invention to provide an apparatus for the production of improved synthetic-resin pipe of large diameter, especially waste or sewage pipe.

SUMMARY OF THE INVENTION

These objects and others which will become apparent hereinafter are attained, in accordance with the present invention, in a system for the production of large-diameter pipe (sewage and waste pipe having a diameter ranging from, say 0.5 meter to three meters) from a thermoplastic synthetic resin whereby the synthetic resin is extruded continuously to form a synthetic-resin hollow-profile strip which is fed to a rotatable support having an axis of rotation coinciding with that of the duct to be formed. On this rotatable support, the strip is formed into helical turns whose lateral faces are thermally fused together with axial pressure on the strip to produce the pipe. The lateral flanks of the strip thus form bonding surfaces juxtaposed with and thermally fused to the adjacent turns on either side thereof. The resulting tubular shell is withdrawn axially from the support at a speed $V_1$.

The invention, more particularly, resides in extruding the synthetic-resin hollow-profile strip with a substantially rectangular outer cross-section and a substantially round inner cross-section, the interior of the strip forming a passage through which a cooling fluid is circulated with the coolant flow being such that coolant fills the passage from the extrusion nozzle or die through at least one turn of the coil upon the rotatable support. The latter turn is pressed against previously laid turns in the lateral or axial direction so that the turns are directly in contact with one another and are thermally welded together.

According to an important feature of the invention, the strip is fed into contact with a previously deposited turn of the helix at a rate (measured parallel to the axis) $v_2$ (axial component of linear feed velocity), wherein $v_2$ is greater than $v_1$ and the difference $(v_2-v_1)$ represents the axial compression of the turns and strip.

The inner cavity is round, as noted, and preferably is originally circular or oval (elongated in the axial direction) so that the deformation during butt-welding transforms the circular cross-section into an oval section (long axis depending radially) or the oval cross-section into a substantially circular section or into an oval section elongated in the radial direction.

When I use the term "substantially rectangular" herein to refer to the outer cross-sectional shape of the thermoplastic strip, it is to be understood that the strip may be square, rectangular in the sense that length and width are of different dimensions, trapezoidal with acute base angles substantially greater than 45° and preferably greater than 75°, or parallelogrammatic with the acute angles substantially greater than 45° but preferably greater than 75°. In general, as described in the aforementioned copending application, the strip after butt-welding into the helical configuration, may have an axial at most equal to the radial thickness. Furthermore, the radial wall thickness of the strip at the free walls thereof (not bonded to adjoining strips) is greater than the lateral wall thickness as measured at the thinnest portions of the wall.

The circulation of coolant through the passage of the hollow-profile strip from the extrusion nozzle over at least one and preferably two or more turns of the helix, can be carried out in any way which is considered effective. Preferably, however, a tube extends coaxially through the extruded strip over substantially the entire length thereof through which circulation is to be sustained and with all around clearance while the clearance at the extrusion end communicates with a discharge port. Thus the liquid flows through the tube and thence around the latter through the outlet. The structure is described in greater detail below.

The cooling stabilizes the wall portions around the passage and represents a deviation from standard practice in which thermal bonding or welding is promoted by addtional heating as a rule.

The cooling step provides a shell immediately around the passage which has a stiffness greater than the plastically deformable portion of the body therearound and permits the transmission of axial pressure to the bonding faces of the turns with less flow of material than has been the case heretofore. In spite of this cooling, therefore, the bond strength (between the still heated outer portions of successive turns) is greater than has been obtainable even with additional heating. In other words, the cooling step of the present invention improves the quality of the pipe where one normally would expect defects to arise because of a decreased bonding hitherto associated with a cooling step.

Axial compaction is facilitated once the strip has been formed into a helix turn by the presence of a core of force-transmitting liquid within the passage of the strip. The liquid prevents nonuniform distortion of the passage and hence maintains the strength of the pipe.

An important characteristic of the configuration of the endless hollow strip according to the present invention is that large accumulations of the synthetic-resin material are formed where the rectangular outer profile defines a corner and the round inner cross-section defines an arc, these accumulations of material serving as material and heat reservoirs for the butt-welding step and the creep destressing of the system.

In spite of the internal cooling of the strip, therefore, these accumulations of material retain the extrusion heat and supply this heat to effect thermal welding when the strip is brought into contact with a previously deposited turn and urged thereagainst. At the junction or weld interface, the material of the previously laid turn and the oncoming strip may thus diffuse into one another so that a substantially monolithic junction is obtained and the resulting duct is capable of withstanding the stresses arising in the subterranean uses thereof as sewage or waste conduit. The cooling of the synthetic-resin hollow profile, of course, must be so controlled that the lateral pressure applied to weld the turns of the helix together can be transferred without permitting the inner passage to collapse.

The present invention can be carried out with any of the thermoplastic synthetic resins heretofore used in the production of synthetic-resin pipe and it has been found that especially polyvinyl-chlorides, polyamides (e.g. nylon) and polyolefins (e.g. polyethylene or polypropylene) and like extrudable, stretchable and thermally weldable synthetic resins provide the best results.

While, as aforenoted, the coolant traversing the interior of the synthetic-resin hollow profile strip (which is helically coiled to form the duct) should pass through the strip at least through one turn of the helix, best results are obtained when the coolant passes through two or more such turns. Especially in the latter case it may be necessary to heat the juxtaposed surfaces of the turns to ensure an effective butt-welding junction therebetween and I may, therefore, heat one or more lateral faces of the oncoming hollow-profile strip and/or the previously formed turns by radiant heating, convective heating, or dielectric heating. Even in these cases, however, the extrusion heat may provide the largest contribution to the heat necessary to effect bonding.

As has been noted, one of the major advantages of the present invention is that it enables the production of synthetic resin pipe of large diameter from a synthetic resin hollow-profile strip without the overlapping weld seams or form fitting connection of successive turns which have hitherto been necessary. The invention is based upon the discovery that the synthetic resin hollow profile, when brought to its deforming temperature (i.e. into a plastic state) can be brought into abutting contact after being wound in a helical turn, with an adjoining turn and a turn readily welded together at their juxtaposed lateral faces, the weld being progressive and following the coiling operation. The axial compression of the turns together is, of course, augmented by the resilient force of the previously formed turns which have cooled sufficiently so as to assume a nonplastic condition. The cross-section of the strip may be modified by the axial pressure and the turns can retain all or a portion of the modified configuration.

The hollow profile strip according to the invention need not be constituted of only a single material but may be formed as a laminate with one or more layers of a light-stabilizing agent, an opacifying agent, and/or coatings resistant to the fluids adapted to contact the exposed surfaces of the duct. Another advantage of the system is that the hollow profile turns of the helix act as springs which permit more uniform distribution of forces than can be obtained with solid-wall pipe and also impart a greater elasticity to the wall of the duct than is obtainable with solid-wall pipe. Consequently, the elastic limit may not be reached as readily with pipe according to the present invention as with solid wall tubing.

Yet a further advantage of the present invention is that the helical-coil ducts of the present invention can be formed readily with an apparatus of relatively simple construction. According to this aspect of the invention, therefore, the apparatus for producing the ducts comprises a tube-coiling machine downstream of a synthetic resin wall-type extrusion press having an extrusion nozzle or die provided with a coaxial mandrel so that the tubular hollow-profile strip is extruded and is coiled upon the machine.

The die has a cross-section which is generally rectangular while the mandrel may have a circular cross-section so that the hollow profile strip is formed with a rectangular (preferably square) outer cross-section and a circular-cross-section passage through which the coolant is circulated.

The tube-coiling machine is formed with an array of angularly equispaced rollers which are driven synchronously and which together define a coiling drum, the extruded strip of synthetic resin material being fed generally tangentially to this drum and being coiled on the roller at a rate such that the axial rate of increase of the coil $v_1$ is less than the total of the width increase $v_2$ so that an axial compression of the strip corresponding to $v_2-v_1$) is generated. The axial pressure is produced by rollers or the like and may also serve to advance the helical-seam duct from the coiling machine.

The system may also include one or more extrusion heads when a laminated strip is to be provided as described above and it has been found to be advantageous to provide, downstream of the extrusion mandrel a calibrating mandrel for imparting the precise internal configuration desired to the extruded strip. A calibrating die downstream of the main extrusion die and cooperating with the calibrating mandrel may be utilized to obtain the precise external configuration and dimensions which may be desired.

According to an important feature of the invention, the extruder mandrel is hollow or tubular and is connected to a source of coolant while the rollers of the tube-coiling drum or cage at the coil end are smooth and of low friction while the discharge end of the rollers is provided with high-friction braking surface, and the axial force applying means is affected so that the width of the strip applied to the coiling drum or cage is at a rate $v_2$ greater than the rate $v_1$ at which the tube is discharged from the coiling machine.

The cooling-supply device may include a flexible coolant supply pipe extending between the extrusion nozzle and the coiling machine and having ports distributed therealong and, if desired, at the end of the perforated tube, the latter having an outer diameter which is smaller than the inner diameter of the synthetic-resin hollow profile and at least has a length equal to the distance between the coiling machine and the extruder plus the circumference of the coiling drum or cage. In other words this supply tube extends through at least one full turn of the helix and preferably through two or more turns thereof. At the extruder and outwardly of this liquid supply tube, there is provided an outlet for the coolant which flows back through the clearance between the supply tube and the extruded strip. A portion of the coolant of course may continue through the coils to the end of the duct remote from the coiling machine, although the low resistance over the long path in this direction ensures that most of the liquid will return around the supply tube as indicated.

It has been pointed out that an important feature of the invention is the provision of the outer surface of the rollers of the coiling drum or cage with a smooth periphery at least in the region in which the turns are first deposited and are butt welded together while downstream thereof along the drum, the rollers having high-friction surfaces, coating or sleeves. As the helical-seam duct is shifted axially along the coiling drum, it frictionally engages the rollers and is frictionally retarded by the high-friction surfaces so that a resistance is provided in the axial direction to the thrust generated by the means for forcing the oncoming strip laterally against the previous turn. By controlling the friction force in this region, e.g. by using replaceable rollers or rollers having replaceable friction sleeves, I am able to control the axial thrust with ease.

The smooth (low-friction) surface of the rollers can be formed by polishing the steel peripheries thereof while the high-friction surface may be made by applying a braking sleeve or coating of rubber or synthetic resin to the steel.

The synchronous drive of the coiling rollers are preferably effected by a belt transmission or a sun gear; in the latter case the sun gear meshes with the pinions of the rollers angularly equispaced for the production of ducts of different diameters, the rollers of the coiling drum must be replaced and it has been found to be advisable to provide means for adjusting the rate $b_2$ at which a width of strip is applied to the coil. This may be accomplished by providing means for varying the speed of the rollers for a constant position of the pressing rollers or for adjusting the position of the pressing rollers along the axis of the helical-seam duct. Of course the presssing rolls may be replaced by a pressing finger or the like if desired.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
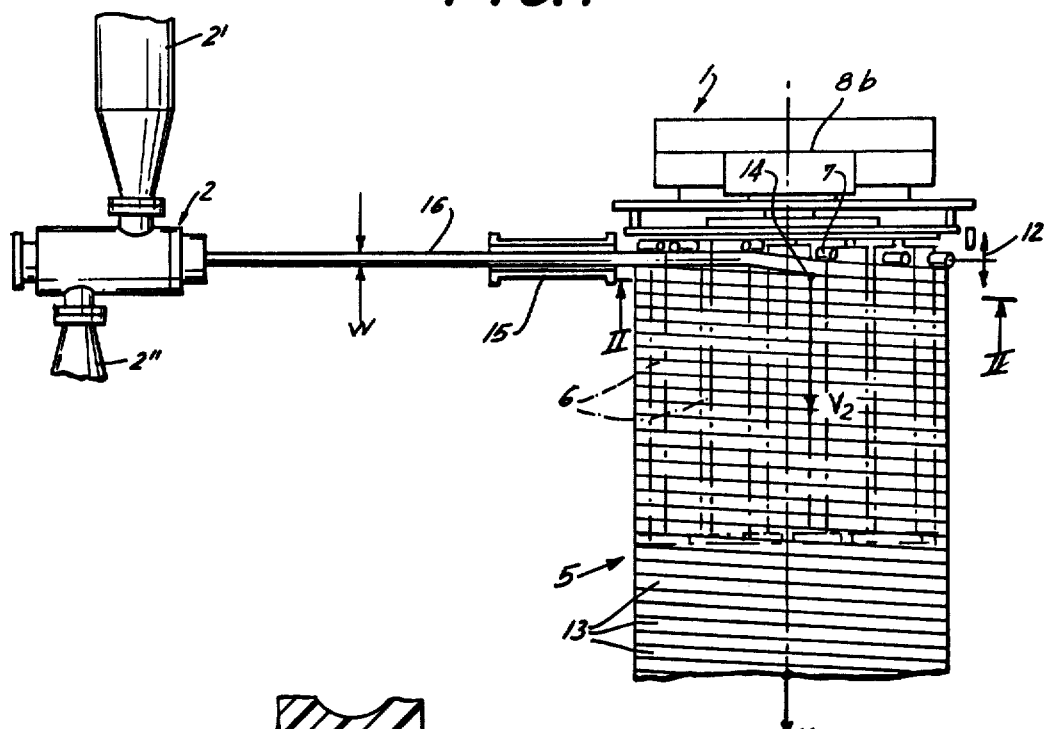
FIG. 1 is a plan view, partly in diagrammatic form, of an apparatus for carrying out the process of the present invention.
Figure 3B:
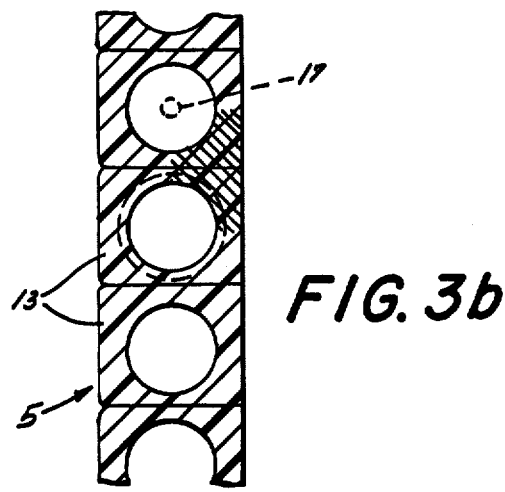
FIG. 3b is a section taken along the line IIIb—IIIb of FIG. 3.

The apparatus shown in the drawing is designed to produce a large-diameter tube, pipe, duct, vessel or container having a cylindrical configuration and composed of a thermoplastic synthetic resin such as polyvinyl chloride, polyethylene or any of the other thermoplastic materials commonly used in the formation of extruded pipe.

The apparatus basically comprises a tube-coil machine 1, a synthetic resin extrusion press 2 (for one or more resins) and a guide or feed arrangement 4 for directing an extruded synthetic resin hollow profile 3 from the extrusion press 2 to the coiling machine 1 in which the continuously extruded strand or strip is helically coiled and the turns are butt welded to form the large diameter pipe which is preferably a sewage or waste pipe.

The extrusion press 2 may be provided with two feed worms 2' and 2" through which different materials may be supplied when the hollow profile is to be completely covered or partly covered with another synthetic resin or with an elastomer or opacifying layer designed to prevent ultraviolet deterioration of the body of synthetic resin forming the strip. Such coated hollow profile members are described and illustrated in the aforementioned copending application.

The work-type extrusion press 2 comprises an extrusion nozzle or die 2a with a mandrel or core 2b and a calibrated tool 2c in the form of a calibrated mandrel or calibrated cylinder to regulate the wall thickness of the tubular strand emerging from the die.

Figure 2:
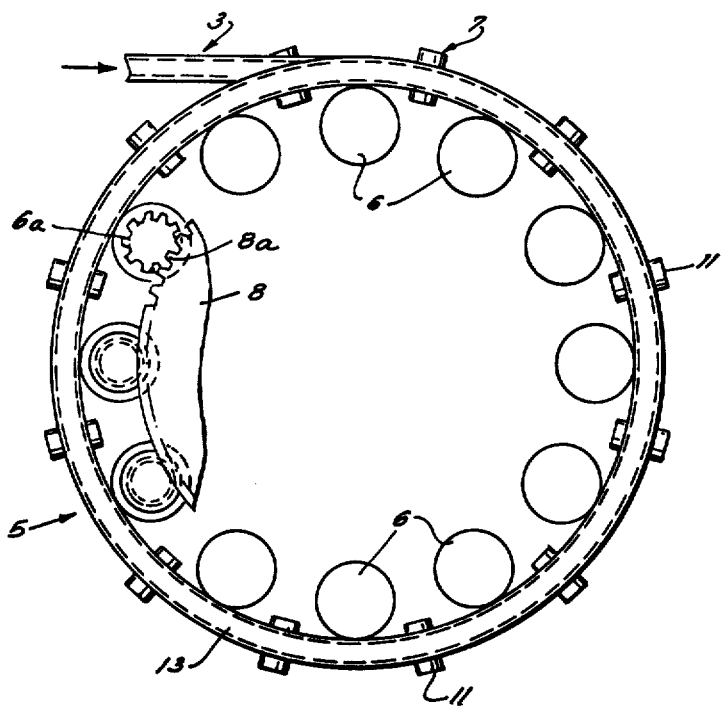
FIG. 2 is a cross-sectional view taken along the line II—II of FIG. 1 but drawn to a larger scale.
Figure 4:
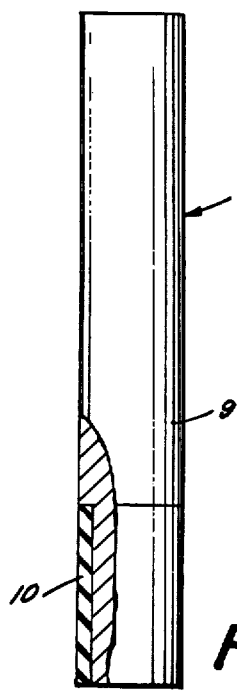
FIG. 4 is a view of a tube-coil roller in elevational view, partly broken away.

The coiling machine 1 comprises, as can be seen most clearly from FIG. 2, a coiling core provided in the form of a plurality of angularly equispaced circumferentially disposed rollers 6 which are synchronously driven. To this end each of the rollers 6 has a pinion 6a meshing with a common sun wheel 8a of a synchronous drive 8. Consequently, all of the rollers 6 are driven in the clockwise sense as the gear $8a$ is driven in the counterclockwise sense by a motor $8b$ (FIG. 1). The turns of the hollow profile strip 3 are thus caused to rotate in the clockwise sense as the pipe advances axially in the direction of the vector $b_1$.

The finished pipe is forced axially off the assembly of rollers 6 at a linear speed $b_1$ as represented by the similarly identified vector in FIG. 1. The hollow profile 3 has an axial width $w$ measured parallel to the axis of the pipe 5 and the vector $v_1$ and is fed to a point of contact 14 with the previously formed turn at a rate which would correspond to a linear rate of increase in the length of the tube as represented by the vector $b_2$, the latter vector being greater than the vector $v_1$. Of course the vector $v_2$ is a function of the pitch of the helix and the width $w$. The vector $v_2$ is greater than the vector $v_1$, the difference being represented by an axial compression of each incoming turn of the helix against the previously deposited turn. The axial pressure is applied by radially extending rollers 7 best seen in FIGS. 1 and 2.

In FIG. 1 the coil rollers 6 are shown in dot-dash lines and can be seen to be parallel to the axis of the coiling machine although it is also possible to have them inclined slightly towards the axis of the machine in the direction of vanes of the pipe. The rollers 6 at their turn-deposition ends are formed with smooth steel peripheries 9 with a low coefficient of sliding friction, while at their pipe-discharge ends they are formed with braking sheaths 10 of rubber or another material having a high coefficient of friction. Thus just as the pipe tends to move off the array of rollers 6 a retarding force is frictionally induced between the rollers 6 of the completed coil or pipe 5.

The coiling rollers 6 are, according to the present invention, adjustable so that the peripheral speed of the rollers may be varied to control the rate at which the synthetic resin hollow profile strip is deposited on the coiling drum. This may be accomplished by providing a number of interchangeable rollers of different diameter but with identical pinion gears so that, for a given rotational speed of the pinion, the peripheral speed will be increased or decreased in accordance with the diameter of the coiling roller 6.

When the axial-pressure rolls 11 of the compaction device 7 are fixed in the axial direction, an increased peripheral speed will increase the value of the parameter $v_2$ and thereby increase the difference $(v_2-v_1)$ and hence the compaction force which is proportional to this difference. Alternatively, or in addition, the compaction rollers 11 of the axial pressure arrangement 7 can be adjusted in the direction of arrow 12 (FIG. 1) on a support now shown so that, for a given peripheral speed of the coiling rollers 6, the decrease to which the strip is compressed as it is laid against the previously formed turn of the helix can be increased. This, of course, corresponds to an increase in the value of the parameter $v_2$.

The axial-pressure rollers 11 can be replaced by pressure fingers without deviating from the principle of the present invention which requires only that as that, as the incoming strip at thermal-welded temperature meets the previously formed turn of the helical-seam pipe, it is applied with lateral and axial force sufficient to affect the bonding. As the strip is applied to the previously formed turn, it increases the length of the pipe at a rate $dv/dt$ where $v$ is the unit increase of the pipe length and $t$ is the unit time. Consequently, if the strip has originally a width in the axial direction of $w$ prior to the application to the pipe and the resulting turn has a width $w_1$ thereafter, the difference $(w-w_1)$ will be the measure to which the strip is compacted over each turn and the value $dv/dt = w_1/T$ where T is the time required to form a complete turn of the helix. Consequently, $v_2 = w/T$ and $(v_2-v_1) = (w-w_1)/T$.

As noted previously, the lateral faces of the strip as it emerges from the extruder retains sufficient heat to effect bonding at the axial pressure corresponding to the compaction of the strip from the width $w$ to the width $w_1$ and this compaction takes place without collapsing the inner passage of the hollow profile strip 3 since the latter is supported by a liquid cushion surrounding the tube 17 extending through this strip. Furthermore, the cooling of the inner walls of the passage stiffens it and forms a tubular spring therefrom so that any force transmission across the passage is effected by the resilient deflection of this cold or congealed wall portion.

Figure 3A:
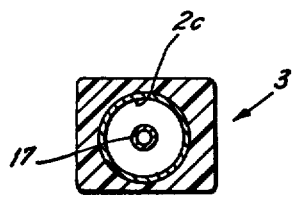
FIG. 3a is a section taken along the line IIIa—IIIa.

In FIG. 3a, I have shown the hollow profile in cross-section and it can be seen that the circular cross-section inner passage is supported at the mouth of the extruder by the internal calibrating sleeve $2c$ while the coolant tube 17 extends centrally through the profile. The hollow profile strip is bonded together in turns with the material at the monolithic butt-weld having a v-section accumulation of materials as represented by cross-hatching and a somewhat congealed skin around the inner passage as represented by dot-dash lines. The cross-hatching portion represents a heat-storage and material storage portion of the pipe to facilitate bonding and permit some creep of the material subsequent to the stressing thereof to eliminate such stress as described in the aforementioned copending application. When necessary, additional heating means may be provided at 15 to bring the lateral faces 16 of the hollow profile to fusion temperature.

Figure 3:
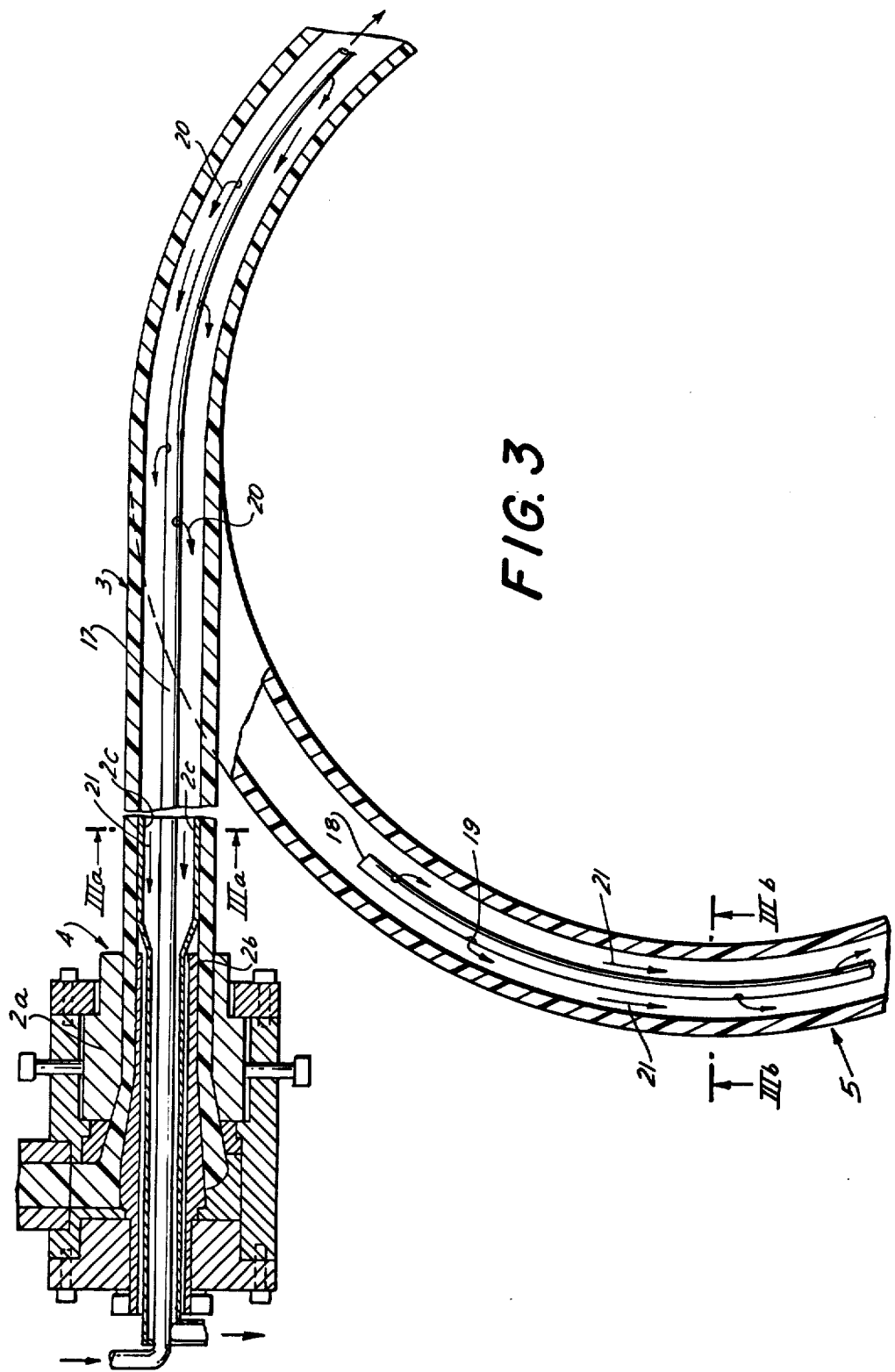
FIG. 3 is a section taken in a plane through the axis of the extruder, partly broken away, to a larger scale than FIGS. 1 and 2.

FIG. 3 shows in somewhat more detail the arrangement of the coolant pipe 17 which is thermally insulated from the mandrel $2b$ so that it does not cool the latter but can deliver coolant (e.g. water) through at least one and preferably over two turns of the helix. The perforated pipe discharges the water as represented by arrows 20 so that the water flows back around the pipe 17 and returns to a discharge tube formed by the sleeve $2b$. The two perforations are represented at 19 and another opening is provided at 18 at the end of the tube. The cooling is sufficient to make the hollow profile 3 sufficiently self-supporting as to be able to bring it into a helical configuration, it being noted that the thermoplastic hollow profile upon extrusion may have no self-supporting character and hence cannot be handled. The coolant returns around the tube 17 because the turns of the pipe ahead of it maintains a hydrostatic pressure preventing significant throughflow of the low pressure coolant.

I claim:
1. An apparatus for making a duct comprising:
an extruder having an extrusion die shaped to produce a continuous hollow profile thermoplastic strip in a thermoplastic state with a rectangular outer cross-section and a round inner cross-section;
a coil-forming machine downstream of said extruder and comprising a coiling drum formed by a plurality of angularly equispaced coiling rollers, and means for synchronously driving said rollers in the same sense of rotation, said strip passing on to said rollers at one end and forming a helix around said rollers advancing axially toward the other end with said helix rotating in said sense of rotation;

means for axially pressing said strip against a coil previously formed on said rollers to bond successive turns together to form the duct with the material of the axially pressed strip blending into the material of a previous turn, said coil-forming machine and said means for axially pressing said strip against a previously produced length of duct being constructed and arranged to axially advance said duct at a speed $v_1$ and apply said strip such that the axial pressure applied to bond each turn to the previously formed turn results in an axial rate of increase in the length of said duct of $v_2$, $v_1$ being smaller than $v_2$ and the difference $(v_2-v_1)$ representing the compaction of the strip upon the application to the previously formed duct and the axial pressure applied to said strip in bonding same to the previously formed turns; and means including a duct extending through said die for passing a cooling liquid through said strip from said extruder through at least one turn of the duct formed on said coiling rollers, said coiling rollers being formed with smooth low friction peripheries at their respective one end and with braking sheaths of high friction at their other ends.

2. The apparatus defined in claim 1 wherein said sheath is composed of rubber or synthetic resin.

3. The apparatus defined in claim 1 wherein said means for pressing said strip against the previously deposited turns of said duct includes axially adjustable pressing rollers arrayed around said drum.

* * * * *